June 24, 1958    J. C. WEAVER    2,840,333
MOUNT FOR GUN CHAMBER MEASURING GAGE
Filed Nov. 18, 1954    3 Sheets-Sheet 1

INVENTOR
JAMES C. WEAVER
BY
ATTORNEYS

INVENTOR
JAMES C. WEAVER

June 24, 1958   J. C. WEAVER   2,840,333
MOUNT FOR GUN CHAMBER MEASURING GAGE
Filed Nov. 18, 1954   3 Sheets-Sheet 3

INVENTOR
JAMES C. WEAVER
BY
ATTORNEYS

United States Patent Office 2,840,333
Patented June 24, 1958

2,840,333

MOUNT FOR GUN CHAMBER MEASURING GAGE

James C. Weaver, Fredericksburg, Va.

Application November 18, 1954, Serial No. 469,869

2 Claims. (Cl. 248—162)

(Granted under Title 35, U. S. Code (1952), sec. 266)

The invention described herein may be manufactured and used by or for the Government of the United States of America for governmental purposes without the payment of any royalties thereon or therefor.

This invention relates to precision measuring devices and more particularly to a device for accurately determining the diameter of a deep internal opening.

Heretofore the measurement of internal openings, particularly such openings as are relatively small in diameter, has been a difficult task. The problem is even more complicated where irregularities in the diameter of the opening exist at various depths or where irregularly-shaped openings are involved. An example of the type of diameter which is measured precisely by the invention is the diameter of the breech end of a gun barrel which, of course, varys along the length of the barrel in accordance with the distance the measuring point is from the end of the barrel. In order to measure the diameter of such an opening it has heretofore been common to employ internal calipers which are inserted into the opening a distance which is accurately predetermined as found by conventional means such as space blocks. The calipers are then removed for checking by an external micrometer to give a measurement of the diameter of the barrel at selected points or stations along the interior of the bore. It is an object of the present invention to provide precision means for determining the diametrical inside measurement of bores without removal of the instrument from the bore for each reading.

Another object of the invention is to provide a device for accurately reading inside measurements of cylinders, holes, slots, keyways, and other openings or spaces and for showing inequalities in opposed surfaces.

Another object of the invention is to provide in combination with a precision measurement instrument, support means for maintaining the measuring fingers of such instrument in light, substantially free floating engagement with the workpiece to be measured.

Another object of the invention is to provide adjustable support means for a precision measuring device wherein the work contacting portions thereof may be guided readily into proper measuring relationship with the workpiece.

Another object is to provide a simple, rugged, and compact measuring device and support therefor having a minimum number of operating parts to influence the accuracy of the measurement reading.

Still another object is to provide a precision measuring device which is particularly adapted to measuring small diameter bores such as bores under one and one-half inches in diameter.

Other objects and many of the attendant advantages of this invention will be readily appreciated as the same becomes better understood by reference to the following detailed description when considered in connection with the accompanying drawings wherein:

Fig. 4 is a view partially in elevation and partially is section of the supporting standard and the connection between the standard and the counterbalance device.

Figure 1:
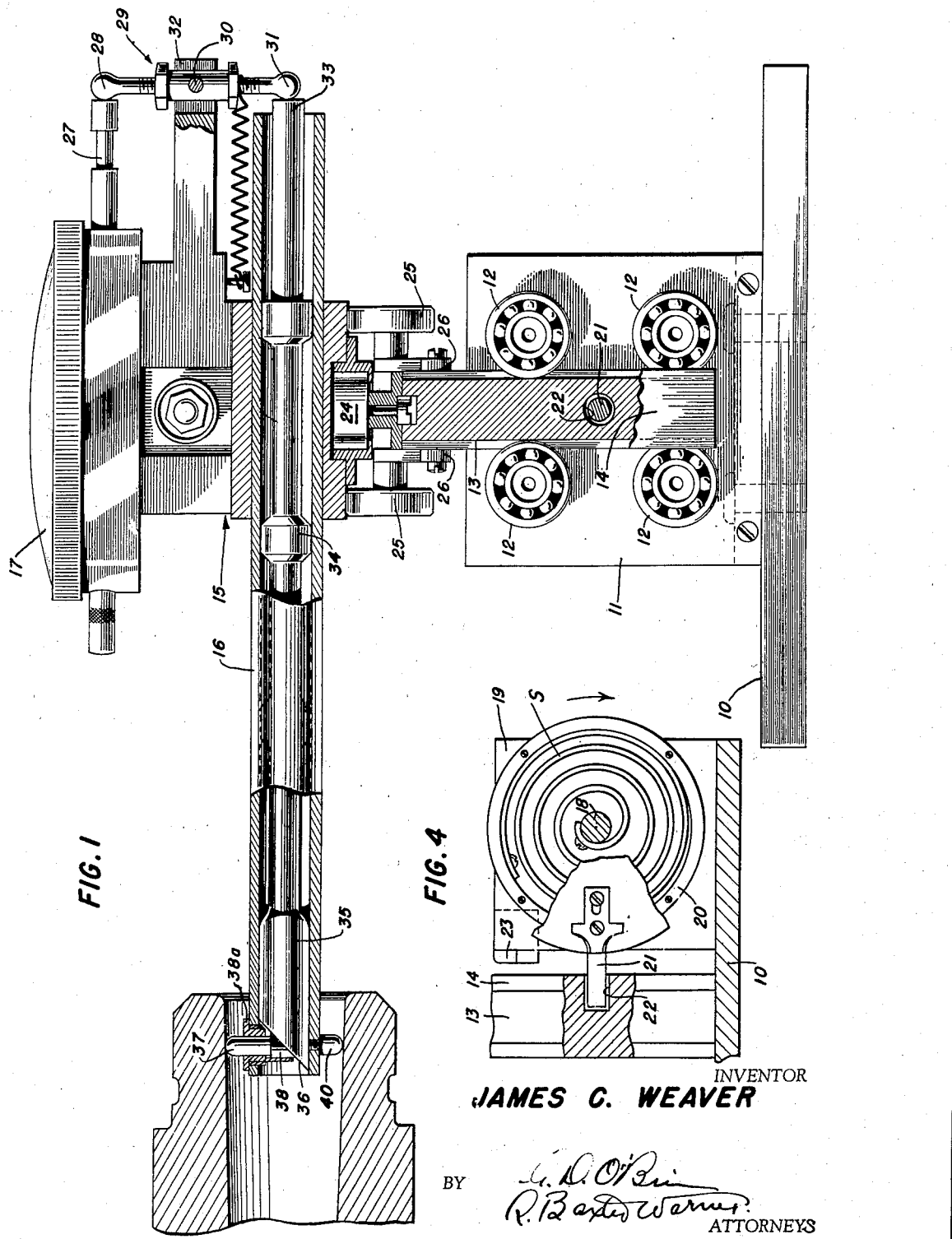
Fig. 1 is a vertical side elevation with portions broken away of one embodiment of the present invention.

In the embodiment illustrated in Fig. 1 there is shown a base 10 having a vertical stand 11 supporting roller bearings 12 which ride in opposed grooves 13 to align a vertically movable standard 14 upon which is swivel mounted a housing 15 having a horizontally extending arm including an elongated tube or sleeve 16 and having a dial test indicator 17 mounted thereon adapted to be viewed from above.

Figure 2:
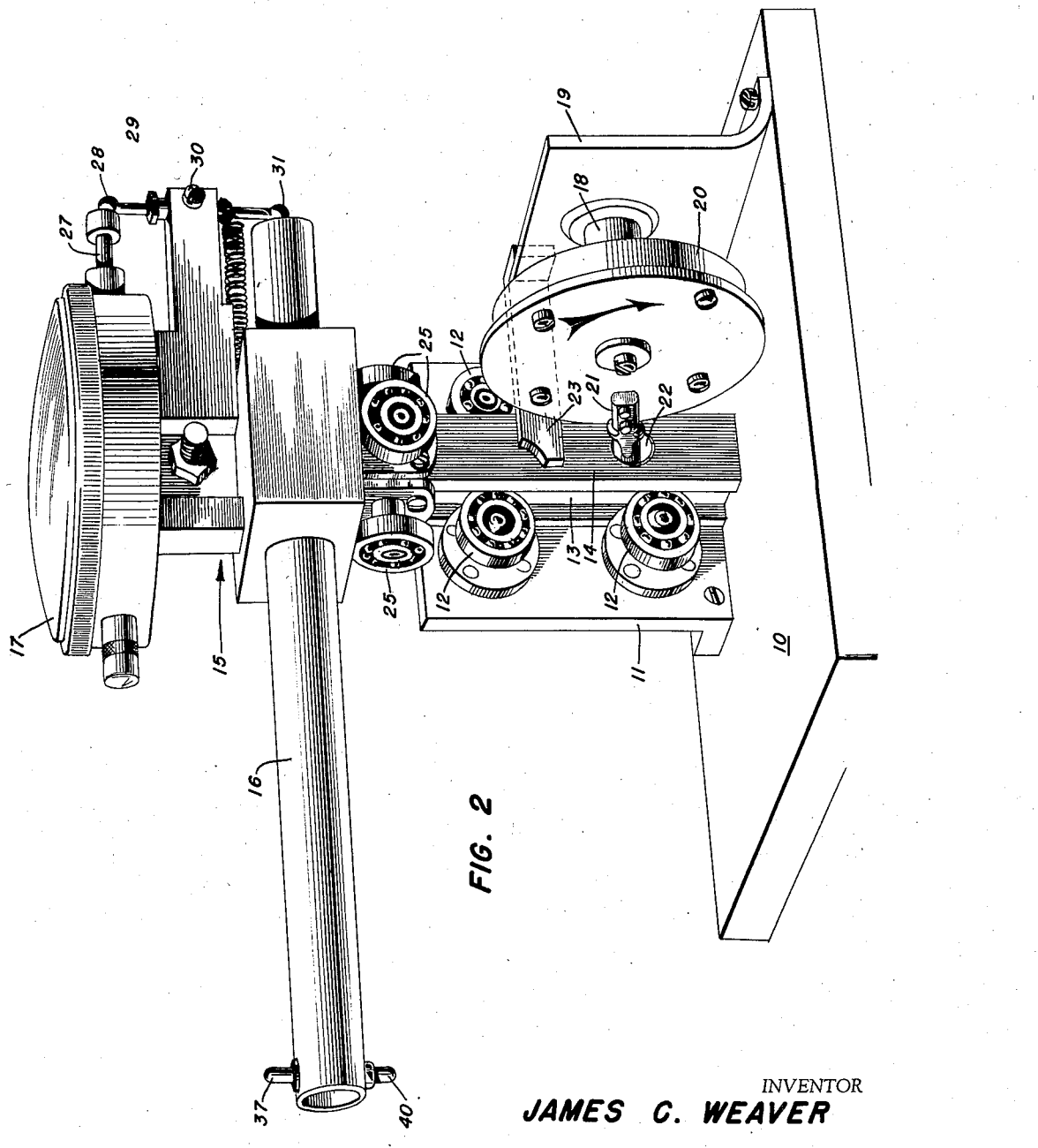
Fig. 2 is a left side perspective view of the embodiment of Fig. 1.

As shown in Fig. 2, compensating means is provided for counterbalancing the weight of the standard 14 and its superimposed parts. This compensating means has a fixed central shaft 18 secured to an upstanding base mounted flange 19 and includes a circular spring casing 20 containing a suitable spring S by means of which the casing is resiliently urged to rotate in a clockwise direction about the central shaft 18. The spring casing is connected to the standard 14 by a radially extending link 21 mounted adjacent the periphery of the casing and extending into an opening 22 in the side of the standard. An upper limit stop 23 supported on flange 19 limits upward movement of the standard.

Standard 14 has located at the top thereof a central horizontally-disposed ball bearing 24 with its inner race secured to the top of the standard and its outer race suitably attached to the undersurface of the housing 15. In addition to this bearing there are provided, in this embodiment, four ball bearings 25 which are mounted about the upper end of the standard 14 on brackets 26. These four bearings support the main weight of the measuring head by contact with the undersurface of the housing 15.

It will be apparent that the above construction permits both vertical movement of the standard and azimuth movement of the measuring head with a minimum amount of friction.

The dial test indicator 17 is of conventional construction and in the embodiment illustrated is supported horizontally upon the top of housing 15. It has a reciprocable plunger 27 contacting the rounded end 28 of a differential arm 29 pivoted at 30 and having a downwardly extending portion 31 bearing against the end of an elongated push rod 33.

In the embodiment illustrated push rod 33 is shown supported within tube 16 by bearing enlargements 34 and terminating in a head 35 having an inclined cam face 36. A single displaceable cam finger 37 has an enlarged lower end 38 bearing against cam surface 36 and the finger is supported in a readily replaceable sleeve 38a so that fingers of different lengths may be substituted for the one illustrated. A diametrically-opposed fixed finger 40 is removably mounted on the undersurface of the tube 16 opposite finger 37.

Figure 3:
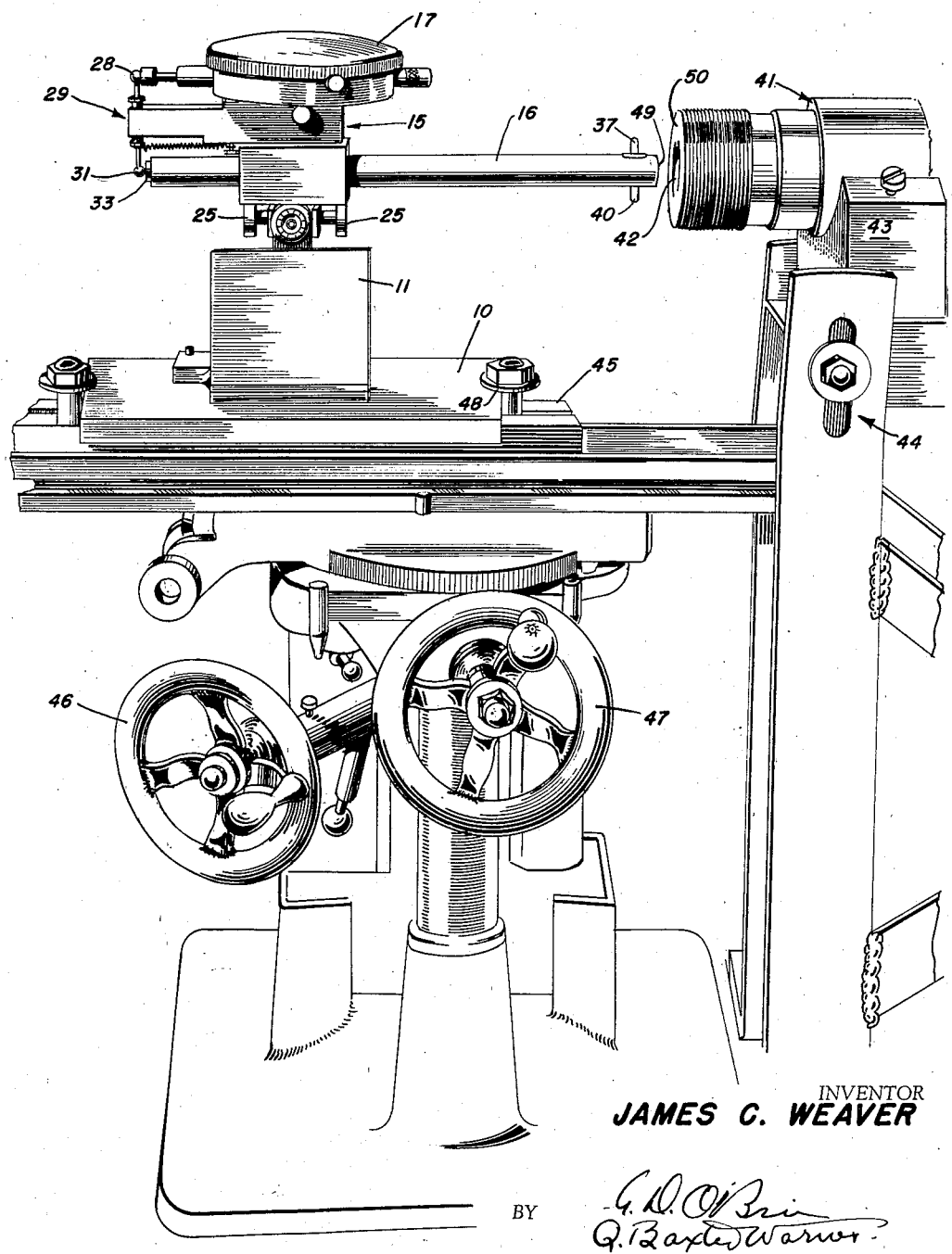
Fig. 3 is a right side view of the embodiment of Fig. 1 shown mounted upon a stand for measurement of a workpiece.

The embodiment illustrated in Figs. 1 and 2 and described above is shown in use in Fig. 3 where there is provided a workpiece 41, such as a rifle breech, having a bore 42 with a tapered interior to conform to the usual shape of a cartridge case. As illustrated, the work is supported by V blocks or the like 43 upon a stand 44 and the measuring instrument of the present invention is supported upon a longitudinally reciprocable table 45 having the usual vertical and azimuth adjusting handwheels 46 and 47. Fastening means such as bolts 48 secure base plate 10 of the instrument in place and appropriate adjustments of the table are made to bring the measuring fingers into alignment with the gun bore 42.

With fingers 37 and 40 installed at the desired lengths a longitudinal feed screw (not shown) is operated to move carriage 45 to the right and cause the tube 16 to approach the gun bore. In order to determine accurately the degree of advancement of the fingers into the bore a gage block first may be fitted between the end 49 of the tube 16 and the face 50 of the workpiece 41 and a note made of the position of the longitudinally adjustable table 45. Thereafter, the gage block may be removed and the fingers may be advanced toward the bore a distance equal to the size of the block plus the distance from the end of the tube to the axis of the fingers. This will bring the center line of the fingers in a common plane with the face of the bore. The dial test indicator 17 has of course been appropriately set to zero, and a direct reading is supplied by the dial test indicator as the fingers move into the bore. Since the advancement of the fingers into the bore can be measured by gage blocks or other suitable means, the stations at which internal measurements are made may readily and accurately be established with this device.

It will be apparent that since the lower finger 40 is fixed to tube 16 a reduction in bore diameter moves the finger upwardly carrying tube 16 and the entire measuring head. Such movement is without distortion of the parts since the parts are ball bearing mounted for free movement and since substantially all of the weight is counterbalanced by the compensator spring casing 20.

In the embodiment illustrated the cam surface 36 is shown disposed at an angle of about 45 degrees and the differential arm 29 is shown adjusted to approximately a one to one ratio. These angles and ratios may of course be modified if desired in accordance with the requirements of the workpiece being measured as will be apparent to one skilled in the art.

Obviously many modifications and variations of the present invention are possible in the light of the above teachings. It is therefore to be understood that within the scope of the appended claims the invention may be practiced otherwise than as specifically described.

What is claimed is:

1. A support for an internal bore precision measuring instrument comprising; a base, a planar stand fixed to the base arranged to extend normal thereto, roller bearings supported for rotation by one face of the stand in vertical-spaced horizontally-opposed pairs, a standard having one pair of opposite sides formed with guide channels and an opening therein adjacent one end thereof, said standard guide channels being receivable between said horizontally-opposed pairs of roller bearings such that the standard is slidably supported by said roller bearings for vertical movement, roller bearings engaged on each surface of one end of said standard rotatable about horizontal axes disposed in the same plane, a housing for carrying a precision instrument mounted on one end of said standard for azimuthal movement and having the housing undersurface in contact with each of the roller bearings engaged on the end of said standard, an upstanding flange fixedly engaged to said base having a planar face in spaced normal relationship to said planar stand, a shaft supported by the flange and disposed to extend laterally therefrom in a plane parallel to said planar stand, a coil spring casing mounted on one end of said shaft for rotation about the longitudinal axis of said shaft and arranged in a plane parallel to said upstanding flange, a coil spring carried within said casing fixed at one end to said shaft and at the other end to the inner wall of said casing so as to normally bias the casing in a clockwise direction, rigid link means disposed within said opening in said standard and secured to said coil spring casing such that the weight of the standard and instrument housing plus the weight of the instrument carried thereby urges the casing in a counter-clockwise direction, and a stop carried by said flange and engageable by said rigid link as said coil spring casing is rotated a predetermined amount in said clockwise direction in response to said vertical movement of the standard for limiting the movement of the standard.

2. A support for internal bore precision measuring instruments comprising; a base, a stand fixed to said base arranged to extend normal thereto, a standard having a pair of opposite sides each formed with a guide channel and an opening provided adjacent one end thereof, roller bearings rotatably supported on said stand in vertically-spaced, horizontally-opposed pairs and disposed in said guide channels in engagement with said standard for guiding and supporting the standard during vertical movement, a housing pivotally mounted on the other end of said standard and carrying a precision instrument for azimuthal movement, bearing elements mounted on said other end of said standard and on opposite sides thereof in engagement with the undersurface of said housing for supporting the latter and thereby provide horizontal stability for the instrument, compensating means including a rotatably mounted spring urged casing carried by said base and having a rigid member secured thereto and extending into the opening in the standard for counterbalancing the combined weight of the standard, the housing and the instrument, and a stop mounted on the base in the path of travel of said rigid member for limiting the vertical movement of said standard as said casing is rotated a predetermined amount by said standard.

References Cited in the file of this patent

UNITED STATES PATENTS

| 1,239,666 | Bladholm et al. | Sept. 11, 1917 |
| 2,051,508 | Wildeboer | Aug. 18, 1936 |
| 2,154,524 | Nelson | Apr. 18, 1939 |
| 2,326,542 | Leonard | Aug. 10, 1943 |
| 2,372,879 | Bjorklund et al. | Apr. 3, 1945 |
| 2,443,880 | Aldeborgh et al. | June 22, 1948 |
| 2,495,797 | Whitlock et al. | Jan. 31, 1950 |

FOREIGN PATENTS

| 575,738 | Great Britain | Mar. 4, 1946 |
| 644,333 | Germany | Apr. 29, 1937 |